United States Patent
Khokhlov

(10) Patent No.: US 8,914,739 B2
(45) Date of Patent: Dec. 16, 2014

(54) DATA PROCESSING APPARATUS AND METHOD

(75) Inventor: Vladimir Khokhlov, Crystal Palace (GB)

(73) Assignee: Sony Corporation, Tokyo (JP)

( * ) Notice: Subject to any disclaimer, the term of this patent is extended or adjusted under 35 U.S.C. 154(b) by 427 days.

(21) Appl. No.: 13/180,827

(22) Filed: Jul. 12, 2011

(65) Prior Publication Data

US 2012/0017162 A1 Jan. 19, 2012

(30) Foreign Application Priority Data

Jul. 14, 2010 (GB) .................................. 1011838.8

(51) Int. Cl.
*G06F 3/048* (2013.01)
*G06F 9/44* (2006.01)
*G06F 17/24* (2006.01)

(52) U.S. Cl.
CPC ............ *G06F 9/4443* (2013.01); *G06F 17/248* (2013.01)
USPC ........... 715/764; 715/788; 715/815; 715/762; 715/763

(58) Field of Classification Search
CPC .................................................... G06F 14/248
USPC ......................................... 715/800, 788, 815
See application file for complete search history.

(56) References Cited

U.S. PATENT DOCUMENTS

| | | | |
|---|---|---|---|
| 6,181,338 B1 * | 1/2001 | Brodhun ........................ | 715/798 |
| 7,146,573 B2 * | 12/2006 | Brown et al. ................... | 715/802 |
| 7,295,221 B2 * | 11/2007 | Ohshima et al. ............... | 345/666 |
| 7,600,189 B2 * | 10/2009 | Fujisawa ........................ | 715/765 |
| 7,614,018 B1 * | 11/2009 | Ohazama et al. .............. | 715/862 |
| 8,276,095 B2 * | 9/2012 | Cutler et al. ................... | 715/804 |
| 8,381,129 B2 * | 2/2013 | Ohazama et al. .............. | 715/815 |
| 8,392,836 B1 * | 3/2013 | Bau et al. ....................... | 715/739 |

(Continued)

FOREIGN PATENT DOCUMENTS

EP  2 023 335 A3  2/2009
WO  WO 2009/016722 A1  2/2009

OTHER PUBLICATIONS

Extended Search Report issued Dec. 23, 2011 in Europe Application No. 11173677.3

(Continued)

*Primary Examiner* — William Titcomb
(74) *Attorney, Agent, or Firm* — Oblon, Spivak, McClelland, Maier & Neustadt, L.L.P.

(57) ABSTRACT

A data processing apparatus executes one or more computer program applications. The data programming, apparatus is operable to display at least one resizable graphical element from a plurality of resizable graphical elements on a display and resize the at least one displayed graphical element in response to a resize control input from a user control. The data processing device is operable to switch between which of the plurality of graphical elements is displayed if the displayed graphical element is resized to be greater in size or to be less in size than one of a plurality of predetermined threshold sizes. Each of the plurality of graphical elements includes at least one graphical object or interface control different from the other graphical elements of the plurality of graphical elements and a greater a size of one of the plurality of predetermined threshold sizes, a greater a number of controls and/or graphical objects included in the graphical element that is displayed when the displayed graphical element is resized to exceed that predetermined threshold size.

18 Claims, 16 Drawing Sheets

(56) References Cited

U.S. PATENT DOCUMENTS

| | | | |
|---|---|---|---|
| 8,464,177 B2* | 6/2013 | Ben-Yoseph et al. | 715/800 |
| 8,484,562 B2* | 7/2013 | Schorsch | 715/269 |
| 2005/0188326 A1* | 8/2005 | Ikeda | 715/788 |
| 2005/0188329 A1* | 8/2005 | Cutler et al. | 715/804 |
| 2006/0103667 A1* | 5/2006 | Amit et al. | 345/619 |
| 2006/0236264 A1* | 10/2006 | Cain et al. | 715/788 |
| 2007/0050729 A1* | 3/2007 | Kawamura et al. | 715/781 |
| 2008/0052637 A1* | 2/2008 | Ben-Yoseph et al. | 715/800 |
| 2008/0195951 A1 | 8/2008 | Oshiro et al. | |
| 2009/0164936 A1* | 6/2009 | Kawaguchi | 715/788 |
| 2010/0050120 A1* | 2/2010 | Ohazama et al. | 715/815 |

OTHER PUBLICATIONS

United Kingdom Search Report issued Nov. 4, 2010, in Great Britain Patent Application No. 1011838.8, filed Jul. 14, 2010.

\* cited by examiner

STATE 1

STATE 2

STATE 3

DATA PROCESSING APPARATUS AND METHOD

FIELD OF THE INVENTION

The present invention relates to data processing apparatuses and methods of displaying resizable graphical elements.

BACKGROUND OF THE INVENTION

Data processing devices such as portable personal computers, mobile telephones, personal media devices and so on, provide users with an increasing number of functions. For example, even a relatively inexpensive mobile telephone might nowadays be expected to provide functions including audio/video playback, internet access, email, content streaming, instant messaging, satellite assisted navigation functionality and so on.

Providing a graphical user interface that enables a user to easily and conveniently understand and use all the available functionality on such devices can be quite difficult. Conventional personal computer "desktop" type graphical user interfaces in which the various functions available to a user are accessed by selecting an icon or the like are less appropriate for data processing devices with limited display space. Moreover, such conventional graphical user interfaces can become increasingly difficult to use when there are a large number of functions available to chose from and display.

SUMMARY OF THE INVENTION

According to a first aspect of the invention there is provided a data processing apparatus for running one or more computer program applications. The data programming apparatus is operable to display at least one resizable graphical element from a plurality of resizable graphical elements on a display and resize the at least one displayed graphical element in response to a resize control input from a user control. The data processing device is operable to switch between which of the plurality of graphical elements is displayed if a displayed graphical element is resized to be greater in size or to be less in size than one of a plurality of predetermined threshold sizes. Each of the plurality of graphical elements includes at least one graphical object or interface control different from the other graphical elements of the plurality of graphical elements and a greater a size of one of the plurality of predetermined threshold sizes, a greater a number of controls and/or graphical objects included in the graphical element that is displayed when the displayed graphical element is resized to exceed that predetermined threshold size.

In accordance with this aspect of the invention, a graphical element is provided which allows the various functions and information accessible via a graphical element to be more conveniently organised and displayed. Conventional data processing devices such as personal computers allow a user to access various functionality and information through various resizable graphical elements. However, keeping track of all the functionality and information provided by conventional graphical elements can be confusing and may not be appropriate for data processing devices with smaller screens, particularly if multiple graphical elements are displayed at the same time. For example, even though a user may be able to resize the various graphical elements, doing so merely obscures or reveals part of the graphical element which makes it unclear to a user what information and functionality is available.

On the other hand in accordance with this aspect of the present invention, once a user has resized a graphical element past a certain predetermined threshold size, the original graphical element is replaced by a second different graphical element. This new graphical element can contain a display of additional or completely different functionality and information from the first graphical element. Accordingly, a convenient means is provided which enables a user to switch between different graphical elements which ensures that all the information and functionality available via the graphical element is displayed at one time whilst reducing the inconvenience that would otherwise arise by displaying multiple graphical elements. Furthermore, the second graphical element may be arranged so that it contains a greater level of functionality and/or it provides more information than the first graphical element. Accordingly, a user can dictate the level of complexity (i.e. available functionality and information) provided by a currently displayed graphical element by resizing it past the predetermined threshold size. This is in contrast to the prior art which merely obscures or reveals part of a single graphical element after resizing.

In one example of the invention, each graphical element is displayed on the display by virtue of one of a plurality of applications being run on the data processing apparatus. The data processing apparatus is arranged to switch between the display of the graphical elements by switching from running a first application associated with a currently displayed graphical element to running a second application arranged to generate a second graphical element in response to the resize control input.

According to this example, the resizing of a first graphical element being provided by a first application can be used to launch a second application which provides a second graphical element. In this example a simple application (i.e. one that is stored in a small amount of memory and can be run quickly and efficiently by the data processing apparatus) can provide a simple graphical element. The simple graphical element may provide a small number of simple functions. If a user wishes to gain access to further functions, for example more complex functions that although related to those provided by the first graphical element are not actually provided in the first graphical element, the user can, for example, resize the first graphical element past the first predetermined threshold size. The second application can then be launched and the second graphical element is then displayed which provides the more complex functionality. As will be appreciated, this arrangement means that an application that is being run at any one time is only as complex (e.g. large) as is needed to support the graphical element being displayed. This reduces a requirement to run unduly complex applications supporting relatively simple functionality.

In another example of the invention, the data processing apparatus is arranged to render each of the plurality of graphical elements on the display at substantially the same time and switch between the display of the graphical elements by displaying only one graphical element at a time as non-transparent.

In this example, the period of time taken to switch between the display of each graphical element is reduced as each graphical element is pre-rendered.

In another example of the invention, when the data processing apparatus switches between displaying an initial graphical element from the plurality of graphical elements to a replacement graphical elements from the plurality of graphical elements, the data processing apparatus is operable to retrieve data from a server to display in conjunction with the replacement graphical element. In some examples the data is user data indicating previous activity of a user using the data processing device.

In accordance with this example, the data processing apparatus is operable to use the resizing operation as a cue to retrieve potentially useful user data from a data source such as remote data server. This can improve the efficiency with which communication resources available to the data processing apparatus are used as data need only be retrieved when actually needed for the display of a particular graphical element.

According to another aspect of the invention there is provided a data processing apparatus for running one or more computer program applications. The data programming apparatus is operable to display at least one resizable graphical element from a plurality of resizable graphical elements on a display and resize the at least one displayed graphical element in response to a resize control input from a user control. Each graphical element includes at least one of a plurality of graphical objects and interface controls. The data processing device is operable to switch between which of the plurality of graphical elements is displayed if a displayed graphical element is resized to be greater in size or to be less in size than one of a plurality of predetermined threshold sizes, each of the plurality of graphical elements including at least one graphical object or interface control different from the other graphical elements of the plurality of graphical elements and at least two of the graphical objects and/or interface controls are associated with functions provided by at least two different computer applications.

According to this aspect of the invention, a data processing apparatus can be arranged to provide a "thematic" graphical user interface. In the thematic graphical user interface, rather than providing various different types of functionality to a user via a number of discrete applications as is the case with conventional graphical elements, the thematic display divides the functionality into "themes" and each theme is then provided with its own graphical element which can be replaced by another graphical element providing further functionality when a user wishes to access more complex functions associated with the theme. The graphical objects and/or interface controls associated with the graphical elements are provided by different applications.

Various further aspects and features of the invention are defined in the appended claims.

BRIEF DESCRIPTION OF THE DRAWINGS

Embodiments of the present invention will now be described by way of example only with reference to the accompanying drawings where like parts are provided with corresponding reference numerals and in which.

DESCRIPTION OF EXAMPLE EMBODIMENTS

Conventional Graphical User Interface

Figure 1:
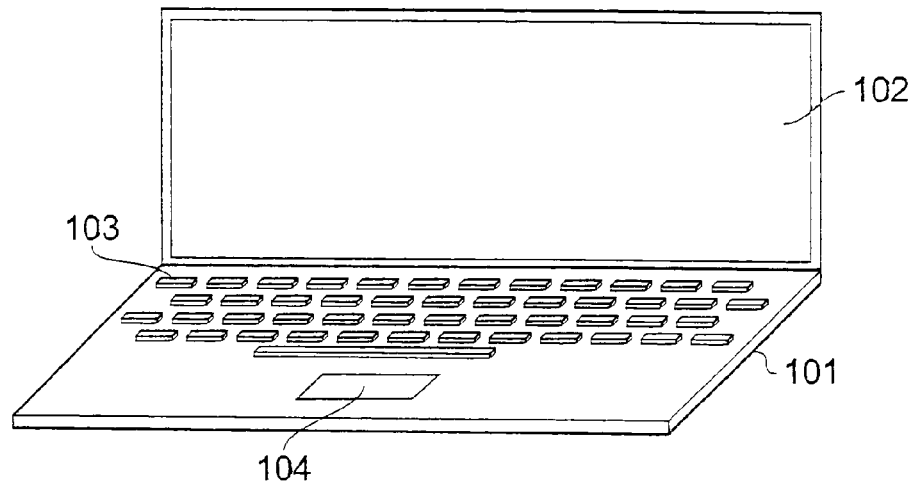
FIG. 1 provides a schematic diagram illustrating a conventional personal computer.

FIG. 1 shows a schematic diagram of a laptop personal computer 101. The laptop 101 is an example of a conventional data processing device. The laptop 101 includes a screen 102, a user control input means including a keyboard 103 and a touch sensitive pad 104. Although not shown in FIG. 1, the laptop 101 also includes a processing unit for running software and memory for storing data.

Figure 2:
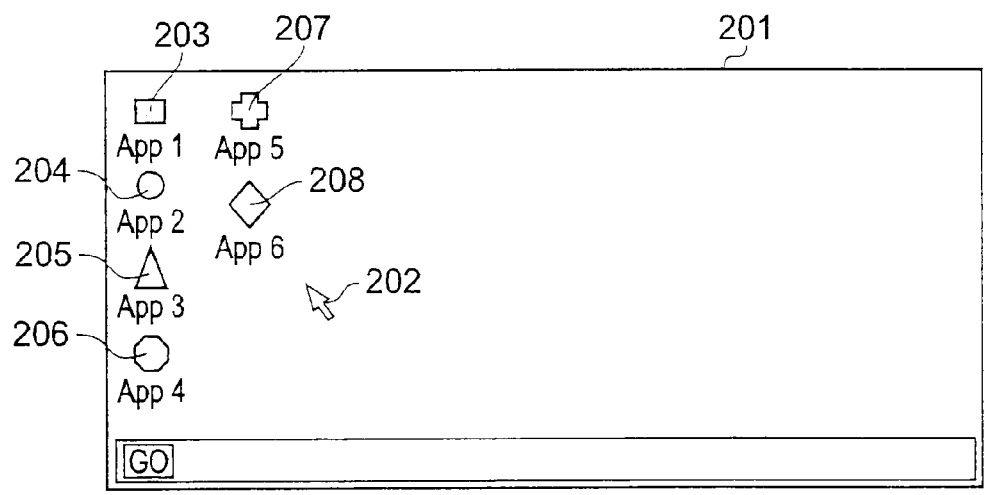
FIGS. 2 to 5 provide schematic diagrams illustrating a number of examples of a view of a conventional graphical user interface displayed on the laptop of FIG. 1.

FIG. 2 provides a schematic diagram illustrating a typical view of a graphical user interface 201 shown on the screen 102 of the laptop 101. The graphical user interface 201 is generated by an operating system which runs on the laptop 101. This graphical user interface 201 is typically the interface provided for controlling most other computer programs that a user may wish to run on the laptop. Examples of graphical user interfaces provided by operating systems include the so-called desktop view of Microsoft Windows XP™ and Vista™ operating systems and the desktop view of Apple MAC OS X™ operating system.

The graphical user interface 201 includes a cursor 202 which a user can move around using the touch sensitive pad 104. A user can "select" items shown on the graphical user interface 201 by moving the cursor 202 to the position of the item and performing a selecting action such as a "double-tap" on the touch sensitive pad. The graphical user interface 201 includes a number of icons 203, 204, 205, 206, 207, 208. Each icon represents an application. An application is a computer program that can be loaded from the memory of the laptop 101 and run by the processor. Each application is typically run under the control of and in conjunction with the operating system. For the sake of brevity details of the interaction between the operating system and the applications will be omitted as these are well known in the art.

Each application provides a user with a number of functions. For example, a first application (e.g. "App 1") may be a web browser allowing a user to surf different internet sites. A second application (e.g. "App 2") may be a media player allowing a user to listen to audio content and watch video content. A third application (e.g. "App 3") may be an email client allowing a user to send and receive email. A fourth application (e.g. "App 4") may be an image viewing program allowing a user to view and edit images such as photographs. A fifth application (e.g. "App 5") may be a spreadsheet program allowing a user to generate and edit spreadsheets. Finally, a sixth application "App 6" may be a word processing application allowing a user to generate and edit text documents.

A user can launch (i.e. load from memory and run on the processor of the laptop) one of the applications by selecting the corresponding icon using the cursor 202. This is shown in FIG. 3.

Figure 3:
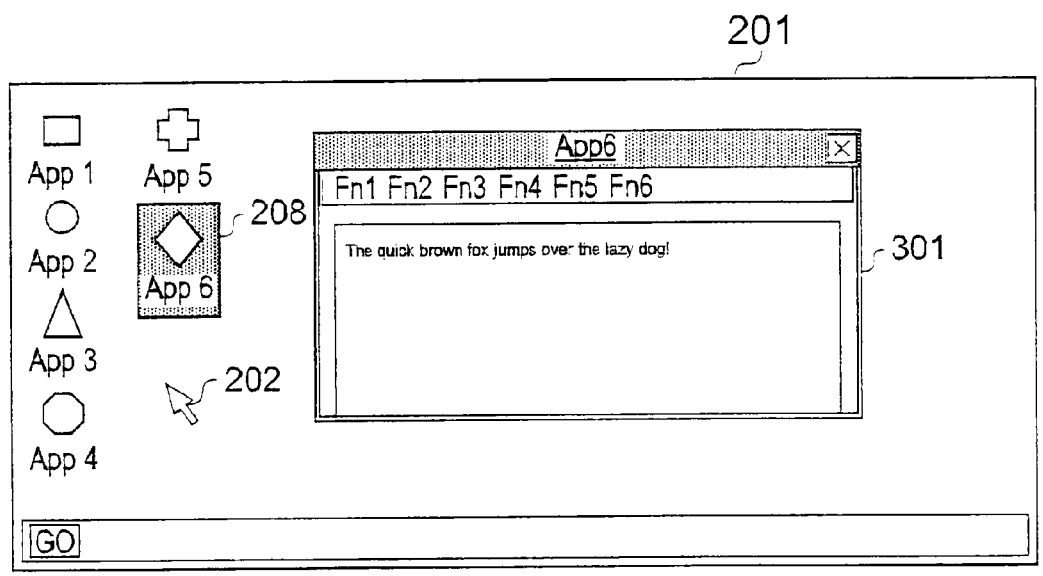

FIG. 3 provides a schematic diagram illustrating the graphical user interface 201 in which an icon 208 associated with one of the applications, "App 6", has been selected. When the icon 208 has been selected, App 6 is launched and a new graphical element 301 associated with App 6 is displayed. The graphical element 301 shown in FIG. 3 is sometimes referred to as a "window", "pane", "control panel" or "dialogue box" with reference to conventional operating systems such as Microsoft Windows. The App 6 graphical element 301 includes graphical objects associated with App 6 (such as a representation of a page and a representation of text that a user has typed using the keyboard 103) and user interface controls such as the "Fn1" icon which a user can select using the cursor 303 which may result in a drop down menu enabling a user to select further functions such as a "create new file" function.

Figure 4:
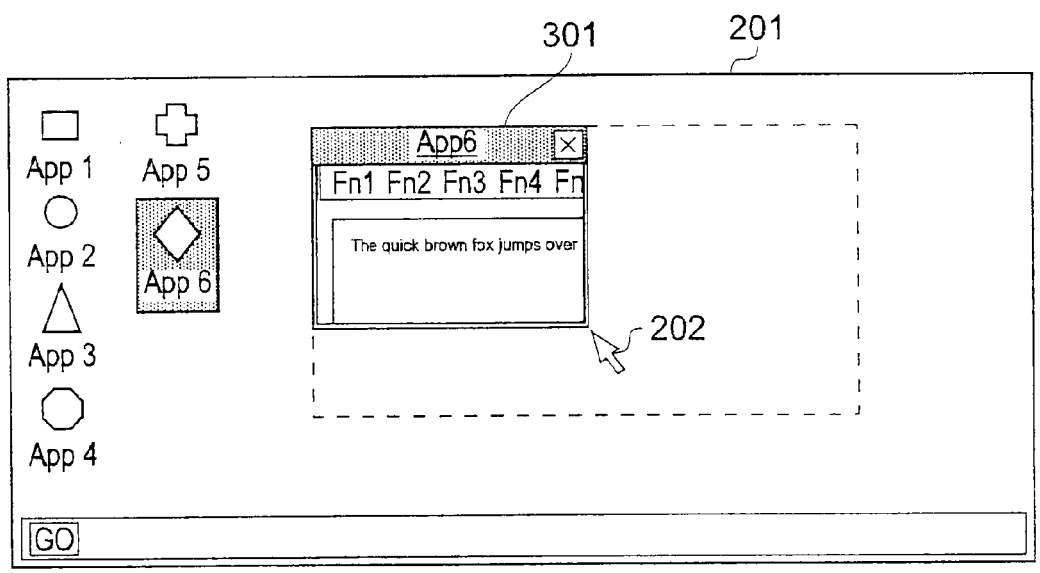

As explained above, App 6 is a word processing application which allows a user to create documents by typing using the keyboard 103. The graphical element 301 associated with App 6 may be manipulated by a user using the cursor 202. This manipulation can include moving the graphical element 301 around and resizing the graphical element 301 by "dragging" and "dropping" in a conventional manner. Resizing the graphical element 301 is illustrated in FIG. 4. Resizing the graphical element 301 may involve changing the height, width, or both height and width of the graphical element 301.

Figure 5:
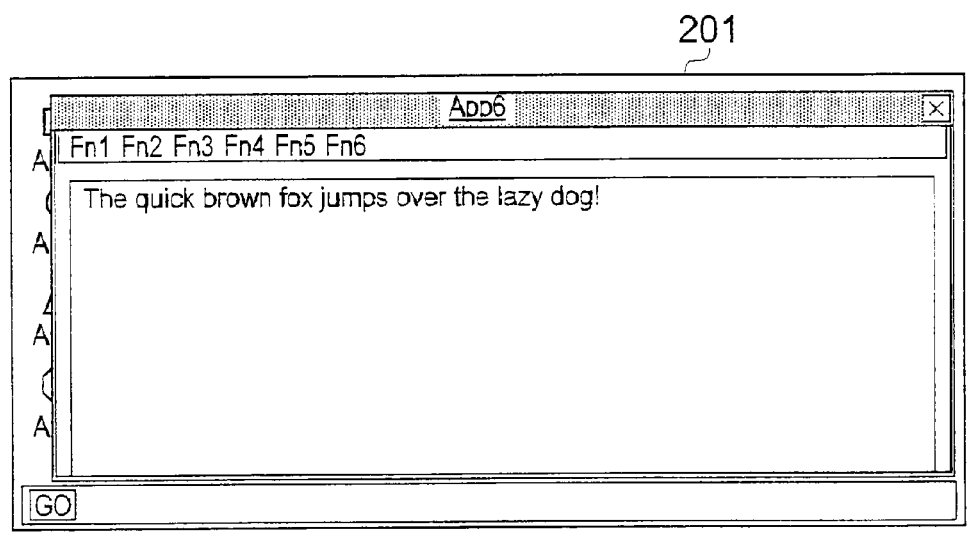

Typically, when the graphical element 301 is resized as shown in FIG. 4 (i.e. by reducing it in size), although the area of the display 201 taken up by the graphical element 301 is reduced, typically a user may still interact with the application. As shown in FIG. 5, the graphical element 301 may also be resized to expand in area.

When the graphical element 301 is resized as shown in FIGS. 4 and 5, a reduced or increased amount of the graphical element is displayed. However, the functions provided to the user do not change. For example, in FIG. 4, although a reduced amount of the graphical element is shown, a user is still able to enter text into the text document, although not all of the text may necessarily be displayed.

Size Dependent Graphical Elements

Figure 6:
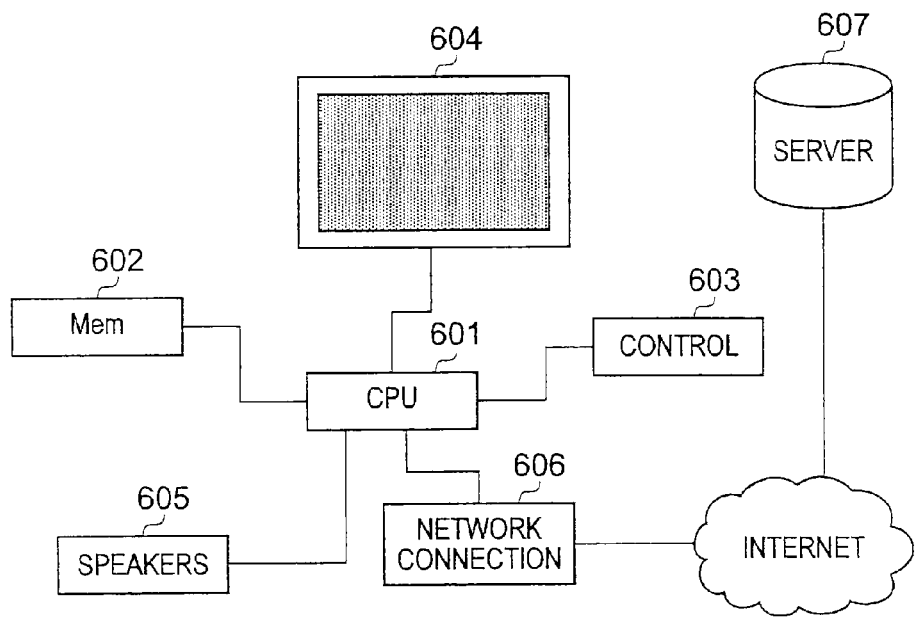
FIG. 6 provides a schematic diagram illustrating an example of a data processing apparatus.

FIG. 6 shows a schematic diagram of a data processing apparatus arranged in accordance with an example of the present invention. The apparatus includes a processing unit 601 and a memory 602 connected to the processing unit 601. The processing unit 601 is operable to execute applications (i.e. computer programs) and the memory 602 is operable to store data such as application data. An application can be stored in the memory 602 in that data representing the instructions for running the application are stored in the memory. As described above, as and when the application is to be run, these instructions are loaded from the memory into the processing unit 601. The processing unit 601 is connected to a control means 603 allowing a user to input control signals to the data processing apparatus. The control means 603 can comprise any suitable means for inputting user commands to the data processing apparatus. Examples include a keyboard, a computer mouse, a touch sensitive pad, a touch sensitive screen, a games console controller and so on.

The processing unit 601 is connected to a display unit 604 which is operable to display video information rendered by the processing unit 601. In some examples the data processing apparatus may be arranged as a laptop as shown for example in FIG. 1. In some examples the data processing apparatus can be connected to peripheral devices such as speakers 605 which are connected to the processing unit 601 and a network connections means 606 such as a modem for the communication of data to and from external networks such as the internet. For example, a remote server 607 can be accessed via the interne.

Figure 7:
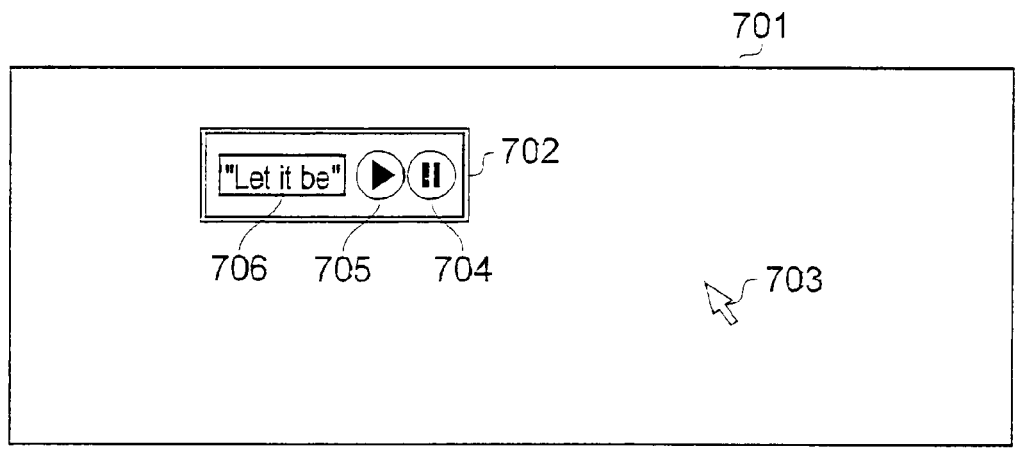
FIGS. 7 to 11 provide schematic diagrams illustrating graphical elements displayable using the data processing apparatus of FIG. 6 in accordance with examples of the present invention.

FIG. 7 shows a schematic diagram illustrating a resizable graphical element 702 generated by an application being run on the processing unit 601 and displayable on the display unit 604. The generation of the graphical element typically involves the processing unit 601 rendering for display the graphical element based on instructions provided by the application. The rendering process typically involves converting the instructions provided by the application into data (for example pixel data) which can then be used to generate a video signal which is sent to the display unit 604.

The application is run in conjunction with an operating system. For the sake of clarity, a graphical element associated with the operating system is not shown in FIG. 7, although it will be appreciated that the resizable graphical element 702 shown in FIG. 7 could be displayed on an operating system graphical element as illustrated for example in FIGS. 2 to 5. A cursor 703 which is displayable on the display unit and a position of which a user can control using the control means 603 is shown. In the example shown in FIG. 7, the application that generates the graphical element 702 is a simple music playback application which reproduces audio content stored on the memory 602 using the speakers 605. In another example, the audio content may be streamed from an external server to the data processing apparatus and received via the network connection 606.

Figure 8:
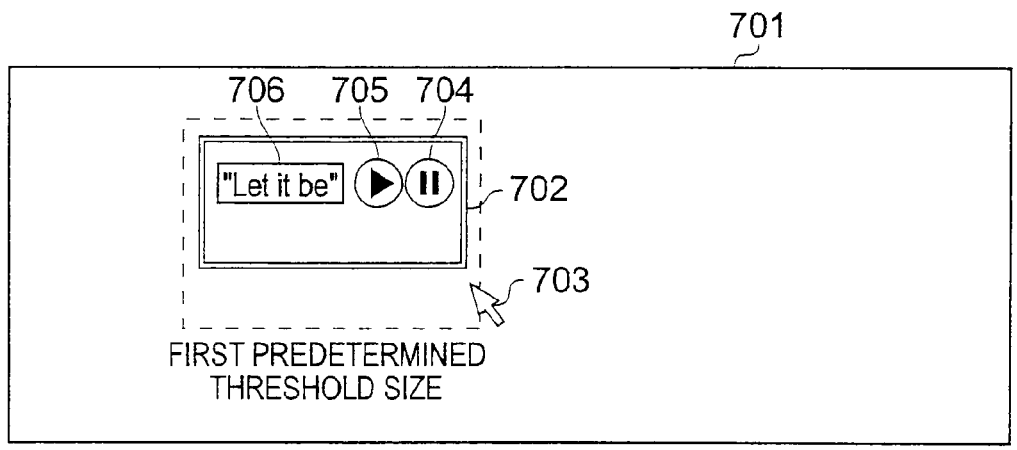

The graphical element 702 associated with the simple music playback application includes a simple user interface control, namely two playback controls 704, 705 that a user can manipulate with the cursor 703, and a simple graphical object, namely an information bar 706 providing information on a music track that is currently being played. As shown in FIG. 8, similar to the graphical element 301 shown in FIGS. 3, 4 and 5, a user can resize the graphical element 702 associated with the music playback application using the cursor 703 by, for example, selecting an outer edge of the graphical element 702 and moving the cursor downwards and rightwards. In some examples horizontal movement of the cursor will increase or decrease the width of the graphical element 702, whereas vertical movement will increase or decrease the height of the graphical element 702. In other examples, the aspect ratio of the graphical element will be constant, i.e. any movement of the cursor which changes one dimension of the graphical element will produce a corresponding change in the other dimension (e.g. moving the cursor horizontally to double the width of the graphical element results in a corresponding doubling of the height of the graphical element). In some examples the graphical element 702 can be resized by performing other operations such as performing a "double-tap" operation on the control means 603 or causing any other suitable pattern of cursor operation to occur.

As will be appreciated from FIGS. 7 and 8, as the user moves the cursor away from the position of the graphical element 702, it will increase in size. However, once the graphical element 702 reaches a first predetermined threshold size it is replaced by a second graphical element.

Figure 9:
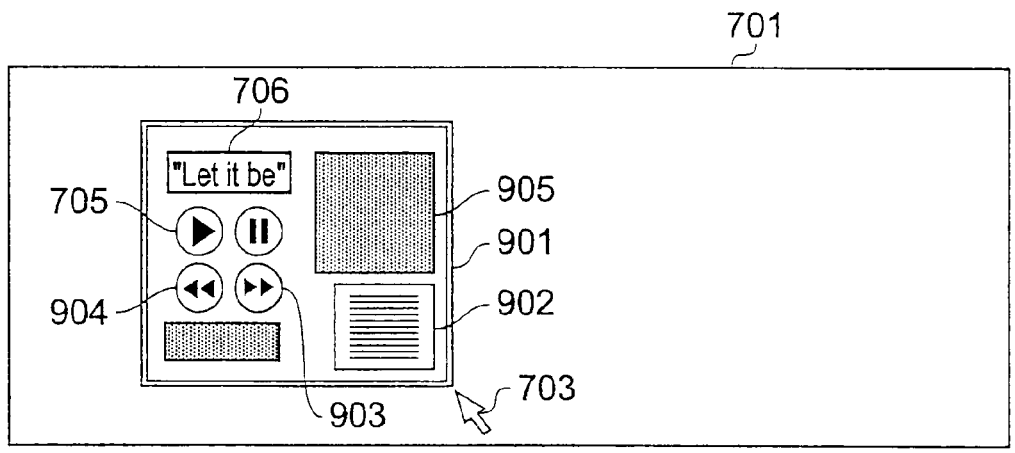

This is illustrated in FIG. 9.

FIG. 9 shows a schematic diagram of a view of the display 701 shown on the display unit 604 of the graphical element that, due to user resizing, has exceeded a first predetermined threshold size. In some examples, the predetermined threshold size can correspond to a threshold area (i.e. the predetermined threshold size is not defined by a specific width value or height value, it is determined by the area which is the width multiplied by the height). In other examples, the predetermined threshold size is defined by a threshold width and a threshold height both of which have to be exceeded. In other examples the predetermined threshold size is defined by a single dimension, i.e. defined by either a threshold height or threshold width.

As is illustrated in FIG. 9, once the predetermined threshold size is exceeded, rather than simply increasing the size of the graphical element 702, a second graphical element 901 replaces the first graphical element. The second graphical element includes graphical objects and user interface controls which are different to those provided with the first graphical element.

Specifically, the second graphical element includes further playback controls 903, 904, a playlist 902 of music related to the currently playing track and an image 905 which is associated with the music track currently being played.

Figure 10:
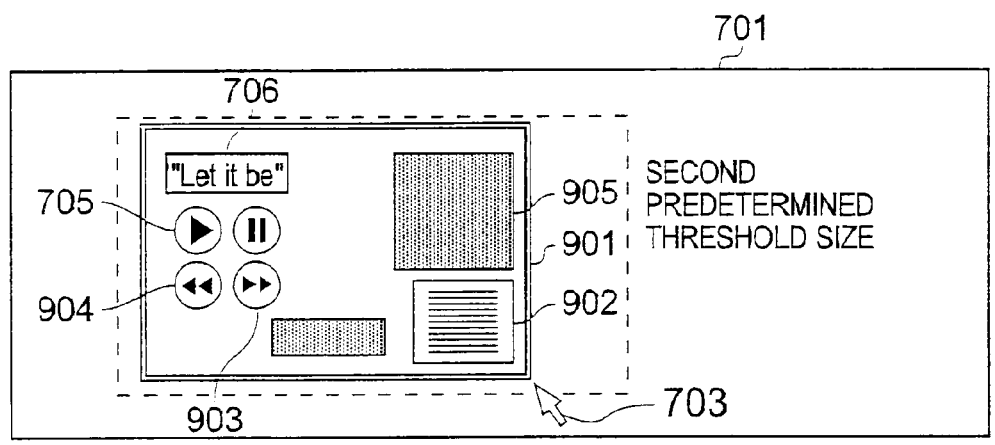

FIG. 10 provides a schematic diagram of a view as the user resizes the second graphical element 901 further using the cursor 703. As can be seen, the size of the second graphical element 901 increases and the relative positions of the elements that are included in the second graphical element 901 have changed. However, despite the resizing, in both the second graphical element 901 shown in FIG. 9 and the resized version of the second graphical element 901 shown in FIG. 10, the graphical objects and user interface controls remain the same.

Figure 11:
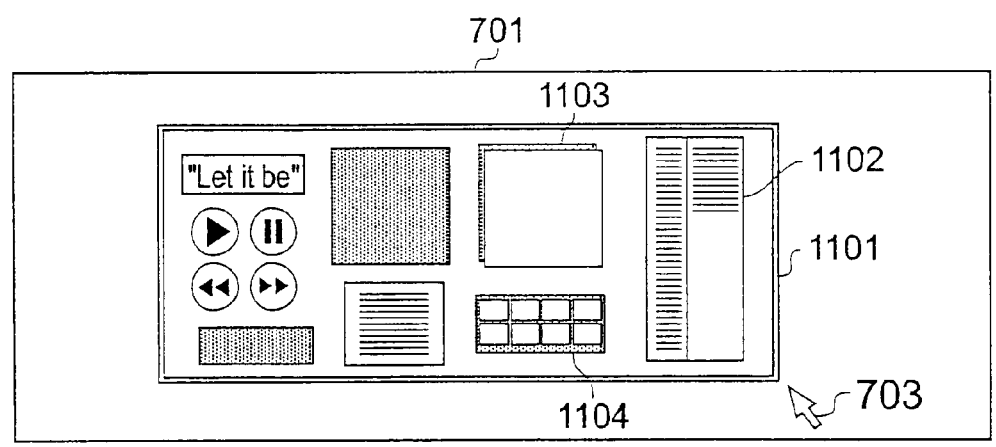

FIG. 11 shows a schematic diagram of the graphical element that, due to continued user resizing, has exceeded a second predetermined threshold size. As described above, the predetermined threshold size can be determined by either an absolute area value or specific threshold height and width values or a specific height value or specific width value. As can be seen from FIG. 11, as the second predetermined threshold size has been exceeded, a third graphical element 1101 is now displayed which along with the previous graphical objects and user interface controls includes yet more graphical objects and user interface controls such as a file directory 1102 which shows various music tracks stored on the memory 602, a web interface 1103 providing access to a website that allows the user to purchase content related to the currently played track and a social networking portal 1104 that includes an indication of music tracks that other users are listening to or have recently listened to.

In some examples, the process illustrated in FIGS. 7 to 11 can happen in reverse. For example, if the third graphical element 1101 is resized so that it is reduced in size below the second predetermined threshold size, the third graphical element 1101 is replaced with the second graphical element 901. Similarly, if the second graphical element 901 is resized so that it is reduced in size below the first predetermined threshold size, it is replaced with the first graphical element 702.

In some examples the actual content of each graphical element may be dependent on a user's previous actions (e.g. a user history) and/or a user profile. Accordingly, when a graphical element is displayed which includes elements dependent on a user history or user profile, the data processing apparatus may be operable to access user data from, for example the remote server 607, via the network connection means 606 to access such user data. Examples of a user history include websites previously visited, online content purchases previously made, instant messages previously sent to other users and so on. Examples of a user profile include profile data indicating online services to which the user has subscribed, a layout of a customised social networking website homepage, online search engine preferences and so on.

In some examples, in order to reduce the time taken switching between graphical elements, each graphical element is rendered by the data processing apparatus at substantially the same time, for example as soon as a first graphical element is displayed. However, all but one graphical element is displayed with an opacity value of zero. As is known, many operating systems permit elements to be displayed with a predefined opacity value which dictates a degree to which they appear to be transparent when displayed. Accordingly, by setting this opacity value to zero, although all the processing and memory allocation processes required to render the graphical elements have been undertaken, the graphical elements are not actually displayed. The graphical element which does not have an opacity value of zero is provided with a non-zero opacity value so that it can be seen on the display means 604.

Figure 12A:
FIGS. 12a to 12h provide schematic diagrams illustrating further graphical elements displayable using the data processing apparatus of FIG. 6 in accordance with examples of the present invention.
Figure 12B:
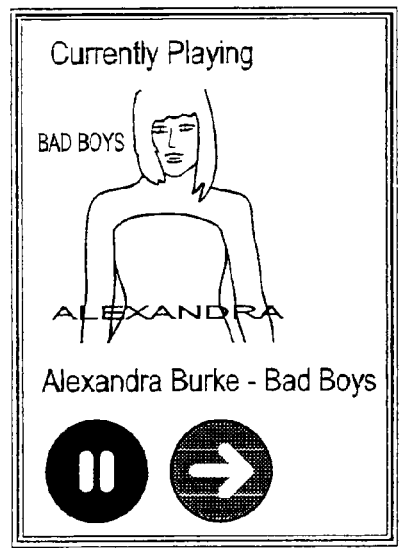
Figure 12C:
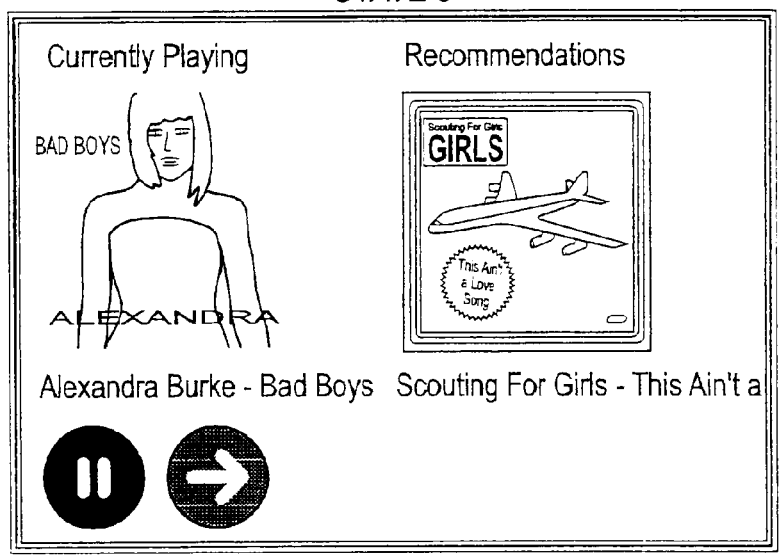
Figure 12D:
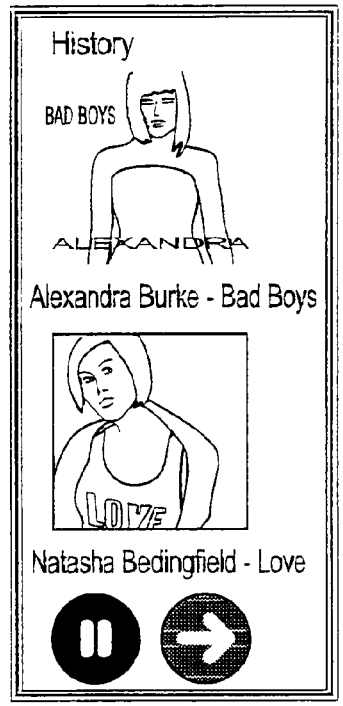
Figure 12E:
Figure 12F:
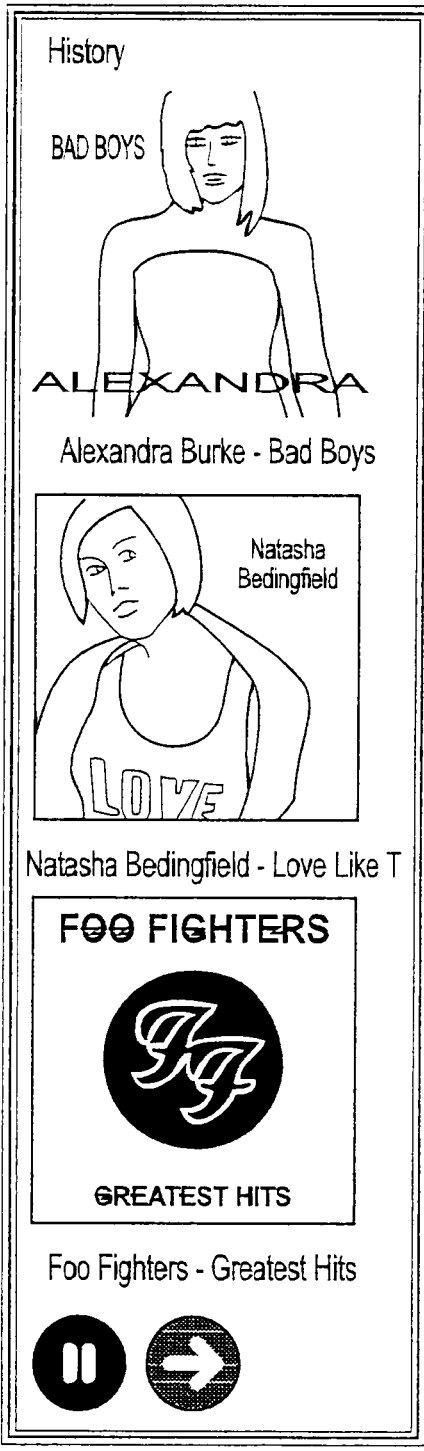
Figure 12G:
Figure 12H:
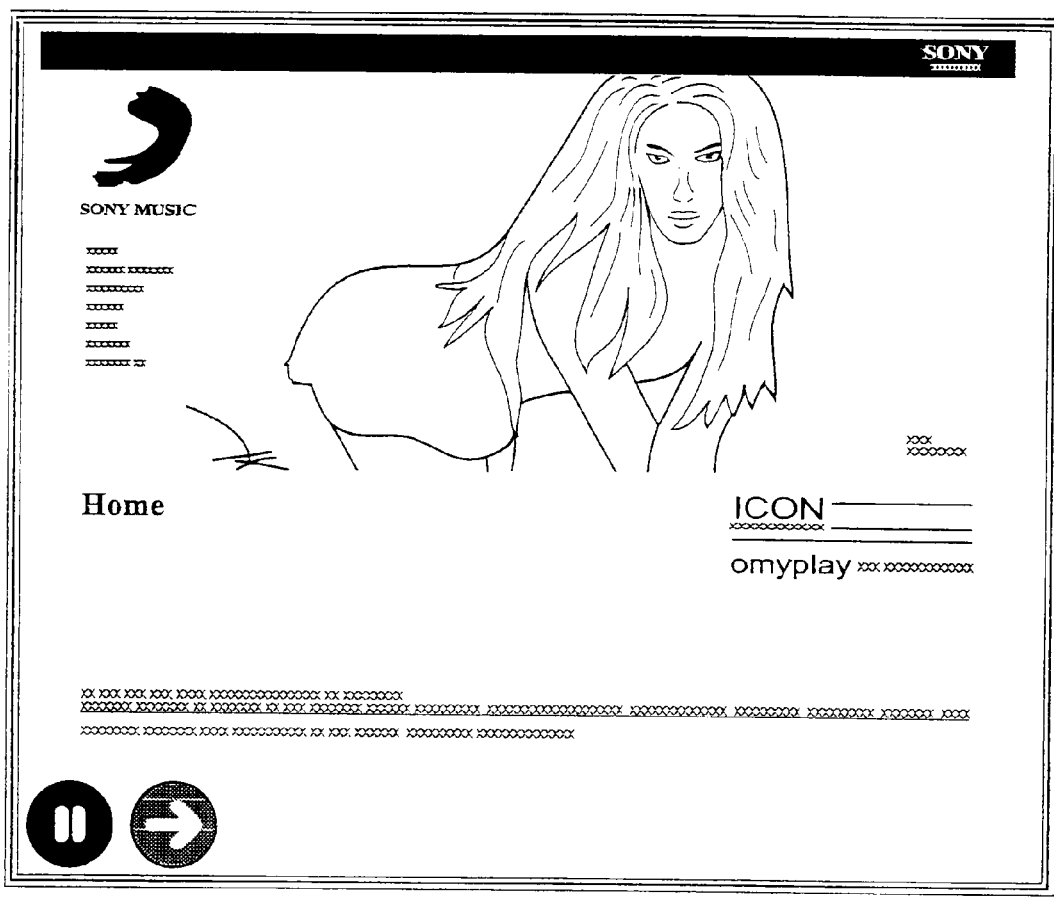

FIGS. 12a to 12h provide schematic diagrams illustrating further examples of a number of resizable graphical elements displayable in accordance with examples of the present invention. FIG. 12a shows a schematic diagram of a first graphical element which when resized to exceed a first predetermined threshold size is replaced with a second graphical element shown in FIG. 12b. When the graphical element shown in FIG. 12b is resized to exceed a second predetermined threshold size, it is replaced by a third graphical element shown in FIG. 12c. When the graphical element shown in FIG. 12c is resized to exceed a third predetermined threshold size, it is replaced by a fourth graphical element shown in FIG. 12d. When the graphical element shown in FIG. 12d is resized to exceed a fourth predetermined threshold size, it is replaced by a fifth graphical element shown in FIG. 12e. When the graphical element shown in FIG. 12e is resized to exceed a fifth predetermined threshold size, it is replaced by a sixth graphical element shown in FIG. 12f. When the graphical element shown in FIG. 12f is resized to exceed a sixth predetermined threshold size, it is replaced by a seventh graphical element shown in FIG. 12g. When the graphical element shown in FIG. 12g is resized to exceed a seventh predetermined threshold size, it is replaced by an eighth graphical element shown in FIG. 12h.

Display States

As described with reference to FIGS. 7 to 12h, once a graphical element is resized to exceed a predetermined threshold size, it is replaced by another graphical element. An alternative way to describe this procedure is in terms of a number of "display states". In other words, each graphical element is considered equivalent to a display state. This concept is illustrated in FIG. 13.

Figure 13:
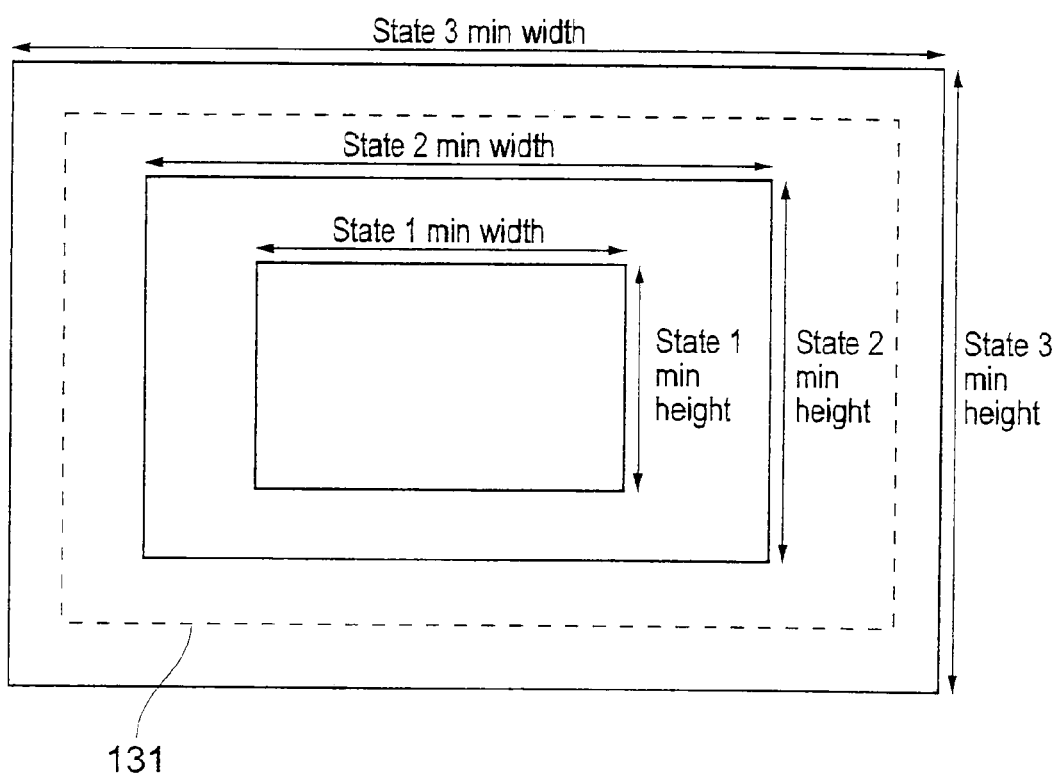
FIG. 13 shows a schematic diagram illustrating minimum widths and heights that define three display states in accordance with examples of the present invention.

FIG. 13 shows a schematic diagram illustrating minimum widths and heights that define three display states. A broken line 131 indicates a current size that a user has resized a graphical element to. As can be seen from FIG. 13, this has exceeded the minimum width and height of display state 1 and display state 2. Accordingly, the graphical element associated with display state 2 is displayed.

As mentioned above, each state is associated with a particular graphical element. Taking the graphical elements shown in FIGS. 8 and 9 as examples, state 1 could relate to a graphical element containing two playback controls and an information bar. State 2 could relate to a graphical element containing further playback controls, a playlist and an image. To illustrate this concept further, Table 1 is provided below which describes the various graphical elements illustrated in FIGS. 12a to 12h in terms of display states and indicates the composition of the graphical element in each case:

TABLE 1

| Display State | Composition |
|---|---|
| State 1 | The icon of the application |
| State 2 | The cover art of the song currently listened to |
| State 3 | The cover art of the song currently listened to and a recommendation |
| State 4 | A history of the current song and the previous song |
| State 5 | A history of the current song and the previous song plus recommendations |
| State 6 | A more complete history |
| State 7 | A more complete history plus recommendations |
| State 8 | A Web page |

First Example Implementation of Size Dependent Graphical Elements

Figure 14:
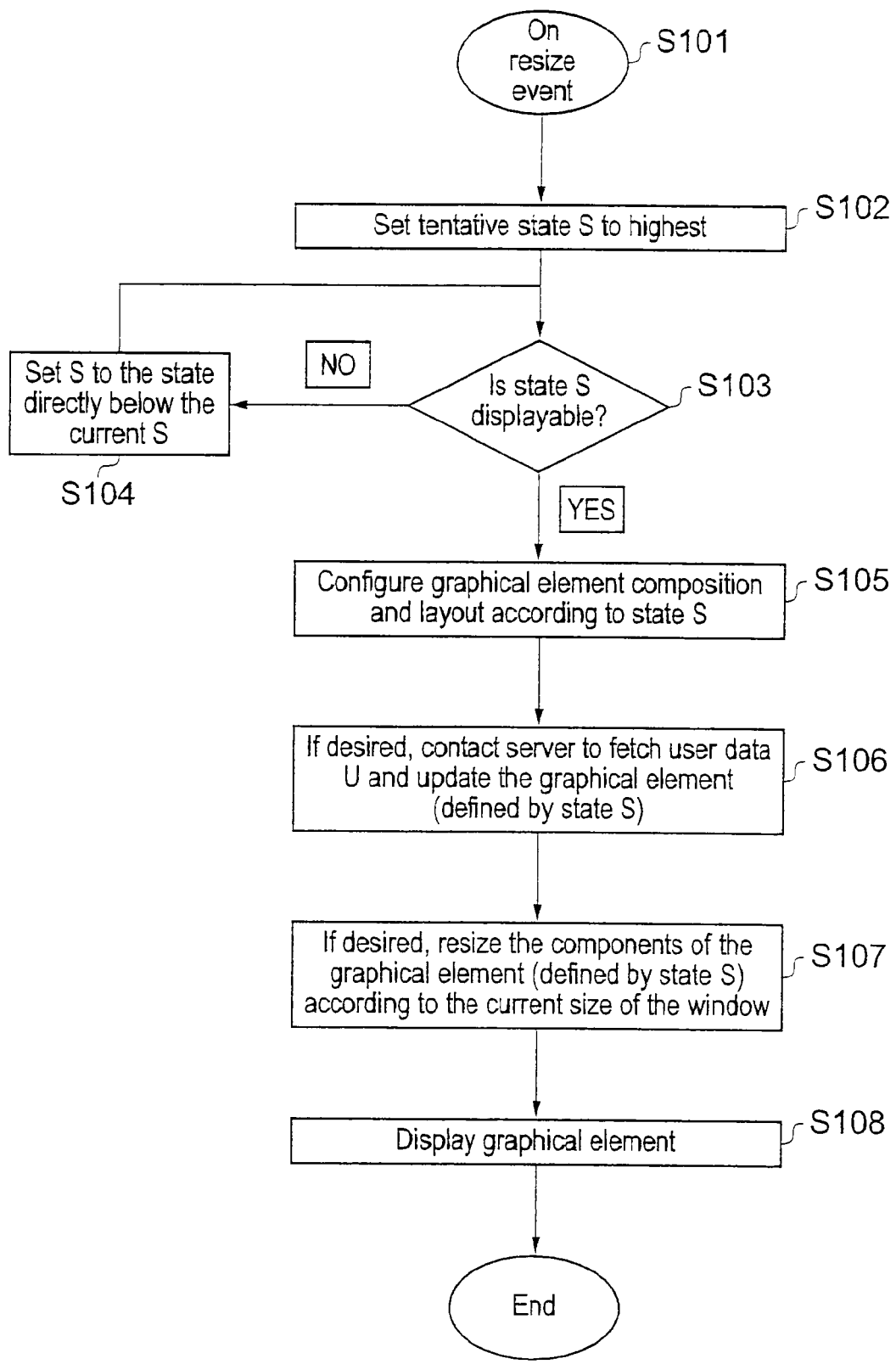
FIG. 14 provides a flow chart illustrating an algorithm for displaying a graphical elements in accordance with examples of the invention.

FIG. 14 provides a schematic diagram of a flowchart which illustrates an algorithm showing a first example implementation of the display of the size dependent graphical elements on the data processing device shown in FIG. 6.

In this implementation an application is arranged to run on the processing unit 601 and a first graphical element is displayed.

At step S101 a resize event is detected as the user uses the control means 603 to resize the first graphical element.

At step S102, the processing unit 601 sets the display state to a tentative "highest" state. The highest state could refer to a most complex state (i.e. a state which provides the most functionality) or a state which is the result of the user resizing the graphical element to its maximum possible size. In the example shown in FIG. 13, the highest state could refer state 3.

At step S103 the dimensions of the resized graphical element are referenced and it is determined if the highest state is displayable. For example, with reference to FIG. 13, assuming state 3 is the highest state, the user has resized the graphical element to a size which is smaller than the minimum width and height associated with state 3. Accordingly, it is not displayable.

In this case the algorithm moves to step S104. At step S104 the state below the current state (which in the example shown in FIG. 13 would be state 2 as this is below state 3) is set as the tentative state.

The algorithm returns to step S103 at which point, in the example shown in FIG. 13, it would be determined that state 2 is displayable because the minimum width and the minimum height associated with state 2 is smaller than that associated with the resized graphical element.

At step S105, the graphical element is configured in accordance with the state determined at S104 (e.g. state 2 shown in FIG. 13).

At step S106 an optional step is performed in which user data from an external server is retrieved to update components of the graphical element that are shown in the selected state and are relevant to user data. For example, this data could relate to past actions of the user such as the purchasing of content online, data relating to social networking and so on.

At step S107 a further optional step is performed in which the components of the graphical element (as defined by the state determined at step S103) are arranged in accordance with the current size of the graphical element.

At step S108 the graphical element is displayed on the display 604.

Second Example Implementation of Size Dependent Graphical Elements

In the examples described above, the graphical elements which replace each other based on the resizing performed by a user may be implemented by a single application. However, as will be appreciated by comparing FIGS. 7, 9 and 11, and comparing FIGS. 12a to 12h, in the examples described above, as a user resizes the graphical element to change between the various different graphical elements, the functionality that a user is provided and thus the complexity of the graphical element changes. In some examples, each graphical element is provided by a separate application which is run on the data processing unit 601.

Accordingly in some examples, the first graphical element 702 is provided by a first simple music playback application. This playback application typically provides very basic functions, for example providing a user with a minimal number of functions to playback music such as a "start playing track" and "stop playing track" function, and a graphical display indicating the name of the track currently being played.

The second graphical element is provided by a second more complex application which, for example, provides a user with further playback functions such as a "fast-forward" function and a "re-wind" function and allows a user to select different music tracks.

Finally the third graphical element is provided by an application which is more complex still in that it provides a user with a comprehensive number of functions to control how music tracks are played back, organised and so on.

Figure 15:
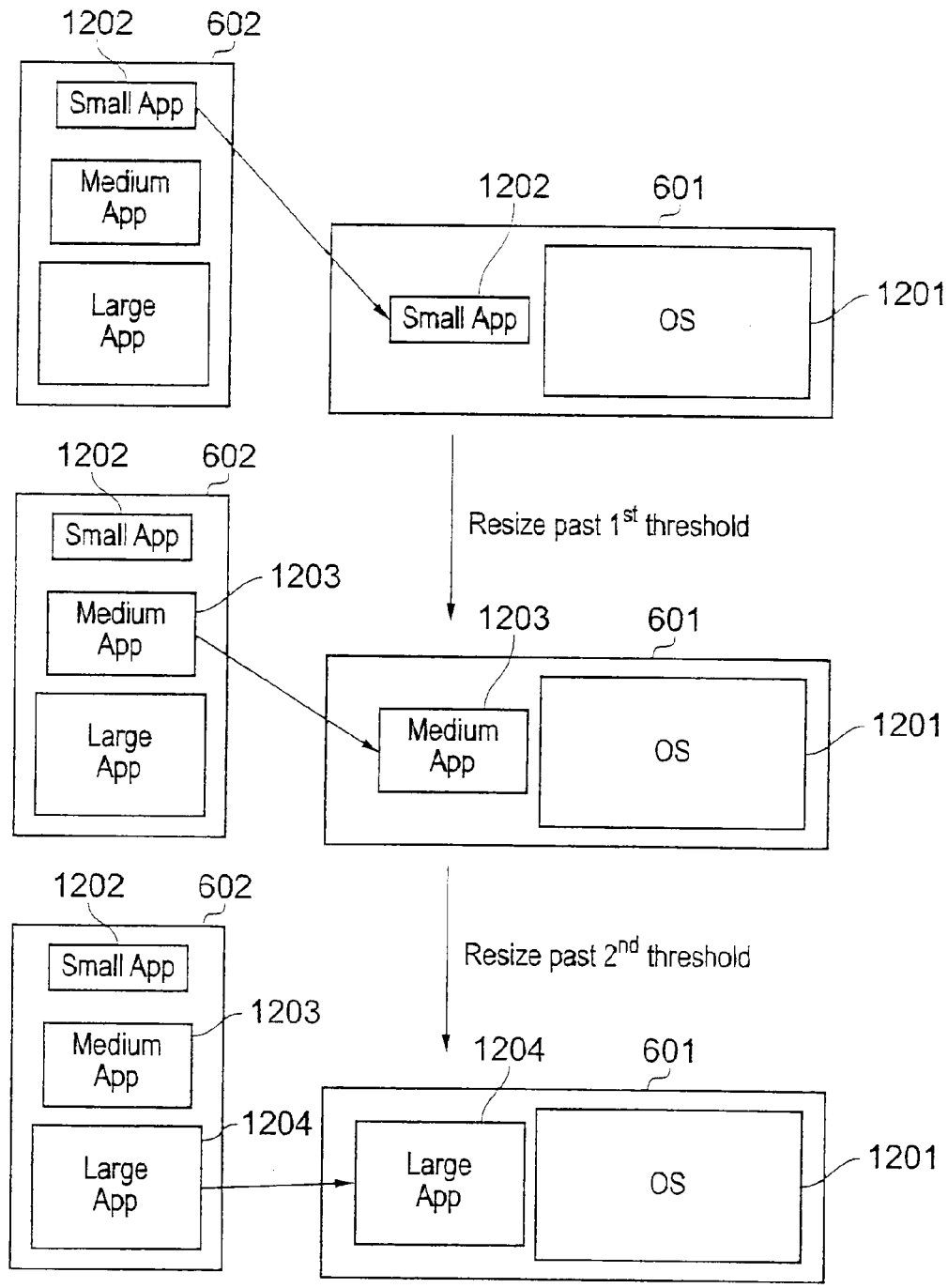
FIG. 15 shows a schematic diagram providing a simplified illustration of how a display of a number of graphical elements can be implemented on the data processing apparatus shown in FIG. 6.

FIG. 15 shows a schematic diagram providing a simplified illustration of how the various graphical elements described above can be implemented on the data processing apparatus shown in FIG. 6.

As shown in FIG. 15, an operating system 1201 runs on the data processing unit 601. Examples of operating systems include Windows, Mac OS X, Linux, iPhone or Android.

In the case shown in FIGS. 7 and 8, the first graphical element 702 is shown on the display 701. As mentioned above, the first graphical element 702 is provided by a simple application 1202 which is loaded from the memory 602 to the data processing unit 601.

As described above, when the user resizes the first graphical element 702 beyond the first predetermined threshold size, the first graphical element 702 is replaced by the second graphical element 901. The second graphical element 901 is provided by the second application. Accordingly, when the user resizes the first graphical element beyond the first predetermined threshold size, the second application 1203 is loaded from the memory 602 to the data processing unit 601. The second application 1203 is then run which provides the second graphical element 901.

When the user resizes the second graphical element 901 beyond the second predetermined threshold size, the second graphical element 901 is replaced by the third graphical element 1101. The third graphical element 1101 is provided by the third application. Accordingly, when the user resizes the second graphical element 901 beyond the second predetermined threshold size, the third application 1204 is loaded from the memory 602 to the data processing unit 601. The third application 1204 is then run which provides the third graphical element 1101.

As will be appreciated, as well as a transition from displaying the first graphical element to the second graphical element, and the second graphical element to the third graphical element, it will be appreciated that the opposite can occur. For example, when a user resizes the third graphical element so that it is reduced to a size below the second predetermined threshold size, the data processing apparatus can be arranged to switch to the display of the second graphical element. Equally, when a user resizes the second graphical element so that it is reduced to a size below the first predetermined threshold size, the data processing apparatus can be arranged to switch to the display of the first graphical element.

Thematic Display

The following describes how the concepts relating to the size dependent graphical elements described above can be employed to provide a thematic display which allows a user to more easily control and navigate through multiple functions provided by a number of applications.

FIGS. 2, 3, 4 and 5 illustrate examples of how the graphical element of a conventional operating system is organised. As discussed above, a series of icons are displayed. When one of the icons is selected by a user a corresponding application is launched which typically results in the display of a resizable graphical element (e.g. a "window"). Other methods of launching applications include opening a drop-down or pop-up menu and selecting an application for launch from a list of applications.

Typically, the applications will include a great deal of related functionality. For example, a web browser application may allow a social networking site to be displayed which allows a user to send and receive messages from other users. However, an email client application may do much the same thing except, whereas the social networking site may permit a user to send and receive simple messages, the email client may allow the user to send and receive attachments with email including data files such as images, audio files, word processing files and so on.

It will be understood therefore, that many of the applications that the user may launch on the data processing apparatus include related functionality. However, in conventional data processing apparatus such as the laptop shown in FIG. 1, this functionality can only be accessed by launching multiple separate applications which can be confusing and inconvenient for a user.

In some examples the data processing apparatus shown in FIG. 6 can be arranged to provide a "thematic display". In the thematic display, rather than providing various different types of functionality to a user via a number of discrete applications, the thematic display divides the functionality into "themes" and each theme is then provided with its own graphical element. Furthermore, as will be understood with reference to the graphical element shown in FIGS. 7 to 11, in the thematic display, the graphical element associated with each theme is resizable. When each "themed" graphical element is resized beyond a predetermined threshold size, the graphical element changes to include a different, typically more comprehensive level of functionality. In other words, the information displayed to the user is more detailed and the graphical element provides a greater number of functions and a higher level of control.

Figure 16:
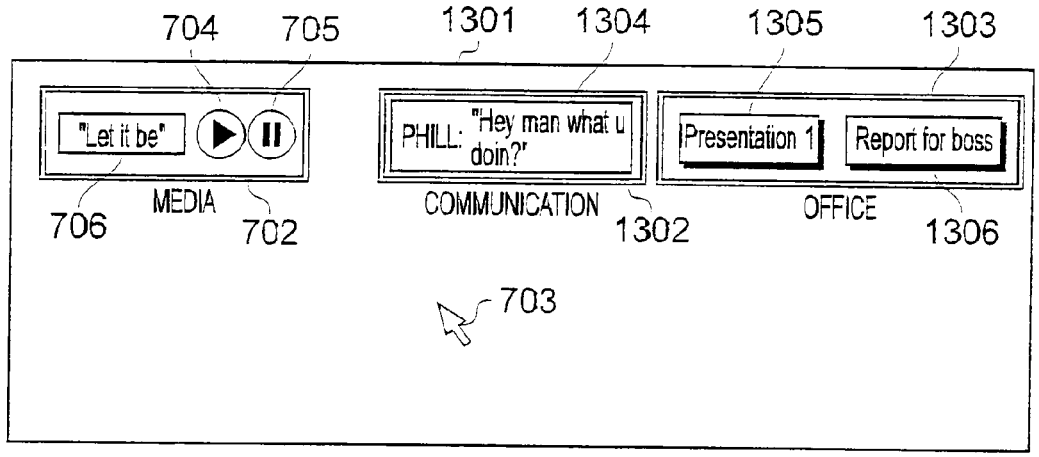
FIGS. 16, 17, 18, 19 and 20 provide schematic diagrams illustrating examples of a thematic display arranged in accordance embodiments of the present invention, and FIG. 21 provides a schematic diagram showing a flowchart illustrating an example method according to the present invention.

FIG. 16 shows a schematic diagram of a thematic display 1301 for display on a data processing apparatus such as that illustrated in FIG. 6 which incorporates the graphical elements principles described with reference to FIGS. 7 to 11.

The thematic display 1301 includes a first "media" graphical element 702 (as described above with reference to FIG. 7), a first "communication" graphical element 1302 and a first "office" graphical element 1303.

The media graphical element 702 provides in one graphical element various functions associated with media on the data processing apparatus, i.e. functions or applications relating to audio and video playback and the managing of audio and video content stored on or accessible to the data processing apparatus. Similarly the communication graphical element 1302 is intended to provide in one graphical element various functions or applications relating to communication such as the sending and receiving of email, instant messaging, VoIP and so on. Finally the office graphical element 1303 is intended to provide in one graphical element access to functions or applications associated with the creation and editing of office type files such as spread sheet, word processing documents, presentations and so on.

As shown in FIG. 16, the first media graphical element 702 includes two playback controls 704, 705 and an information bar 706 providing information on a music track that is currently playing. The first communication graphical element 1302 includes a simple message pane 1304 which includes a most recently received message from another user. The first office graphical element 1303 simply includes two icons 1305, 1306 which represent two most recently edited files. The first icon 1305 represents a most recently edited presentation and the second icon 1306 represents a most recently edited word processing file.

Figure 17:
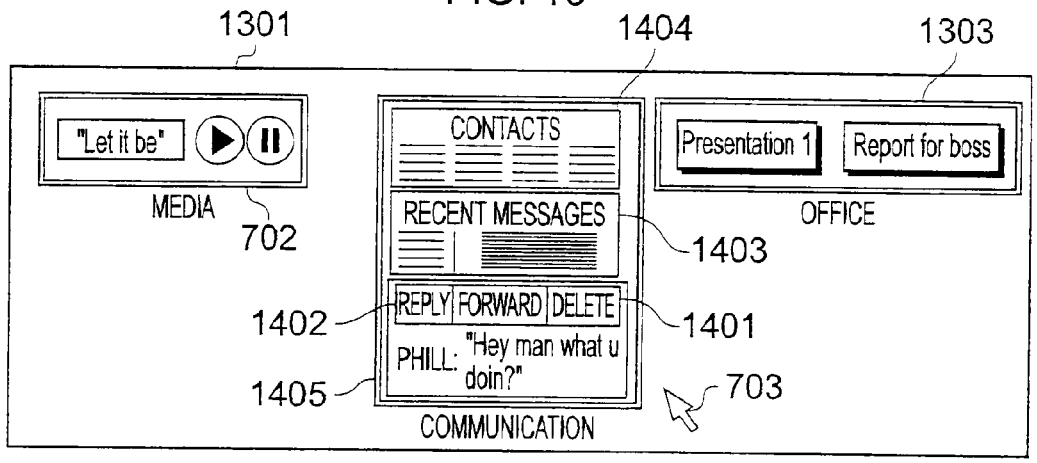

FIG. 17 shows a schematic diagram illustrating the display 1301 after the first communication graphical element 1302 has been resized beyond a predetermined threshold size and the first communication graphical element 1302 has been replaced by a second communication graphical element 1405. As can be seen, the original simple message pane 1304 from the first communication graphical element has been replaced by a more complex message pane including further controls 1401, 1402. A "Recent Messages" pane 1403 is included displaying recently received messages and a contact list 1404 is included providing a list of contact details such as email addresses.

Figure 18:
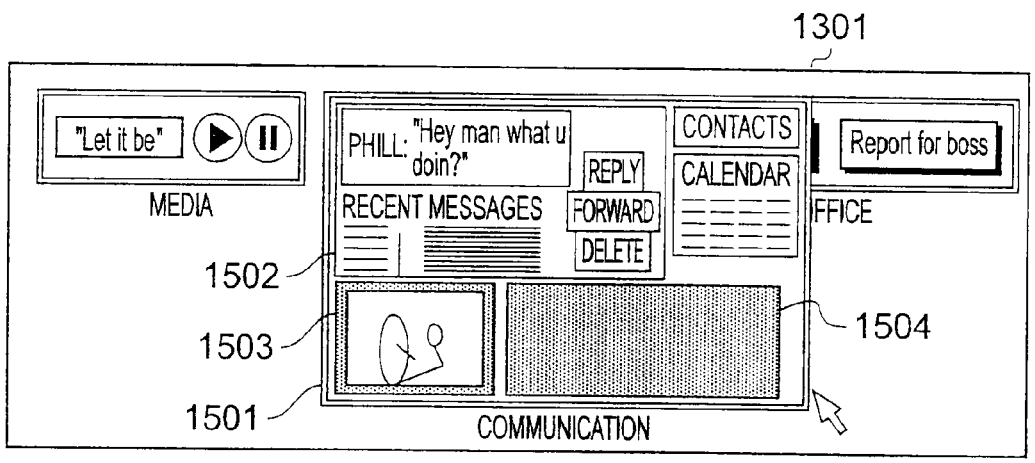

FIG. 18 shows a schematic diagram illustrating the display 1301 after the second communication graphical element 1405 has been resized beyond a second predetermined threshold size and replaced by a third communication graphical element 1501. As can be seen, a very detailed messaging pane 1502 is provided which includes controls and information panes that allows a user a high degree of control over the sending and receiving of messages and managing of contacts. The third communication graphical element 1501 also includes a video pane 1503 that allows the user to take part in video conferencing. The third media graphical element 1501 also includes a web browser pane 1504 which provides access to a social networking website.

Figure 19:
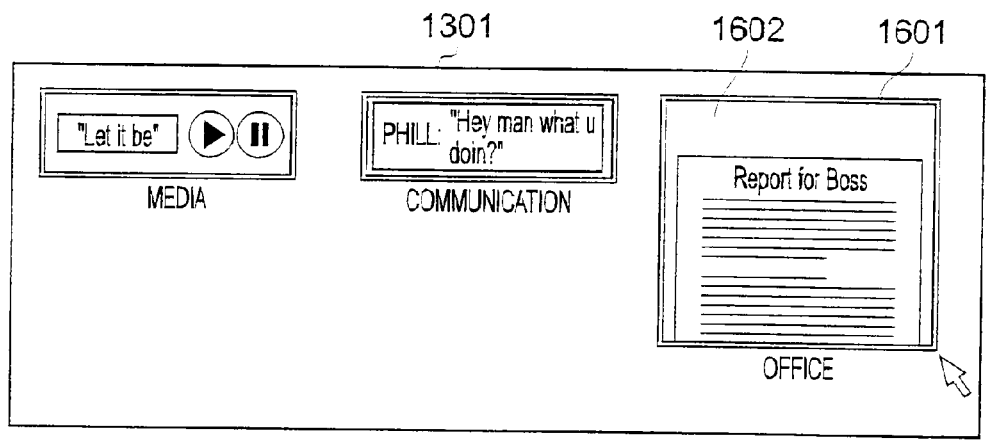

FIG. 19 shows a schematic diagram illustrating the display 1301 after the office graphical element 1303 has been resized beyond a predetermined threshold size and the first office graphical element 1303 has been replaced by a second office graphical element 1601. As can be seen, the original two icons 1305, 1306 which represent two most recently edited files have been replaced by a pane which shows an editing screen 1602 for editing the most recently edited file which was indicated by the first icon 1306. In this example, the user is able to begin directly editing the most recently opened file by simply resizing the first office graphical element 1303.

Figure 20:
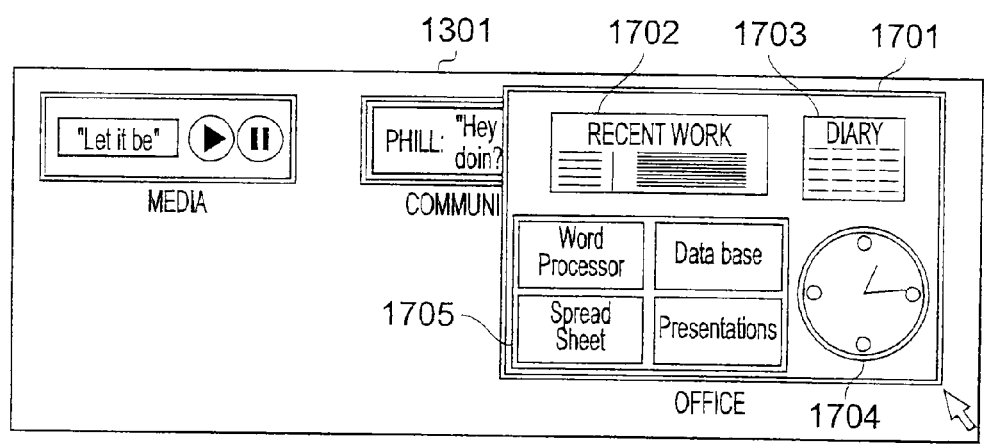

FIG. 20 shows a schematic diagram illustrating the display 1301 after the second office graphical element 1601 has been resized beyond a second predetermined threshold size and replaced by a third office graphical element 1701. As can be seen, the editing screen 1602 has gone and is replaced by a recent file pane 1702 providing a detailed overview of recently edited files; a diary pane 1703 showing the user's schedule and allowing the user to add and delete appointments and so on, a clock graphic 1704 indicating the time, and an application pane 1705. The application pane 1705 provides icons which allow a user to launch conventional applications (such as a spreadsheet application, word processor application, presentation application and so on) by selecting an appropriate icon.

The various interface controls and graphical objects shown within the graphical elements illustrated in FIGS. 16 to 20 may be provided by different applications. For example the video pane 1503 of the third media graphical element 1501 maybe provided by a video conferencing application whilst the web browser pane 1504 may be provided by a web browser application.

Figure 21:
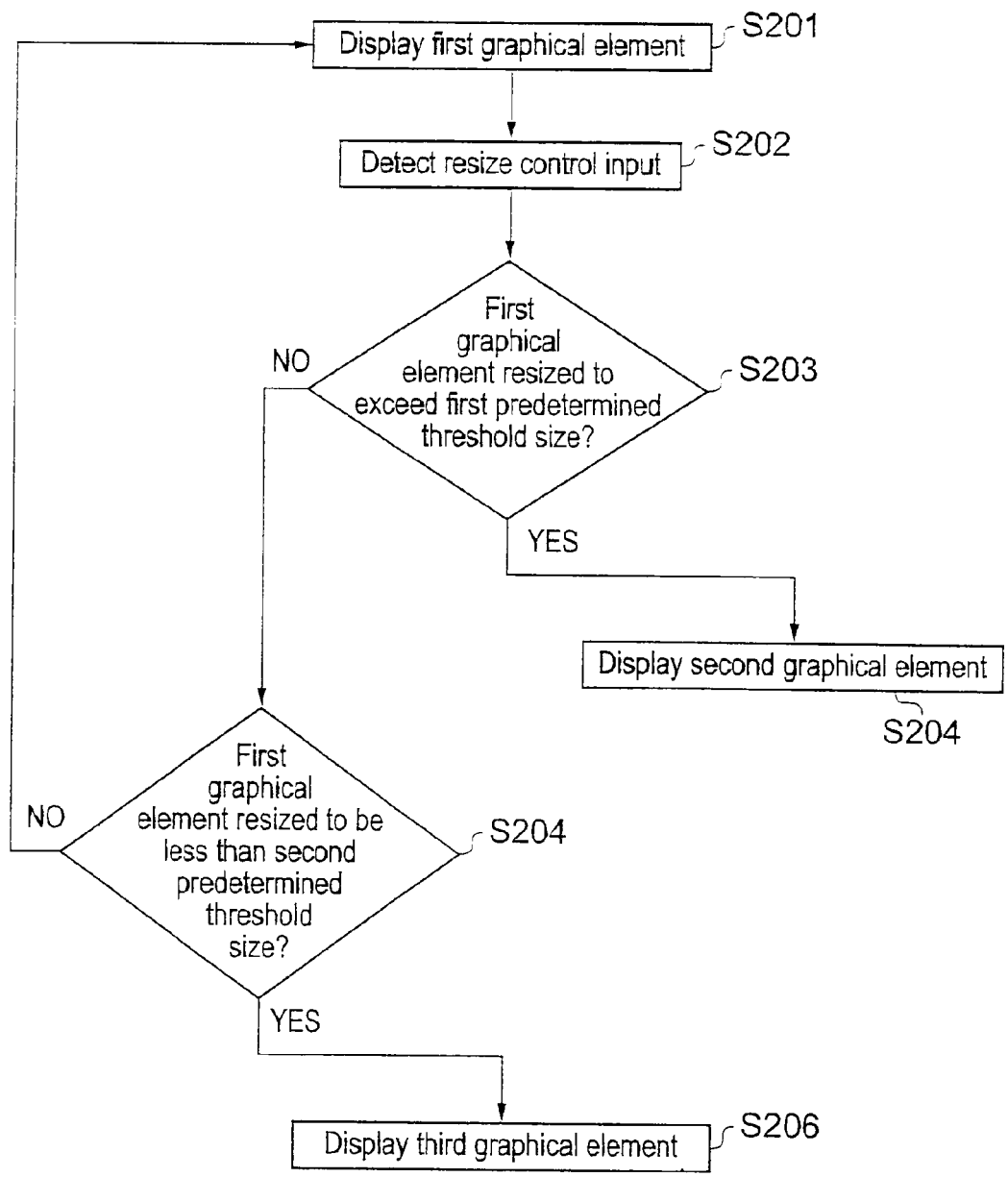

FIG. 21 provides a schematic diagram showing a flowchart illustrating an example method according to the present invention. At step S201 a first graphical element is displayed by a data processing device. At step S202 the data processing apparatus detects a resize control input which causes the data processing apparatus to resize the display of the first graphical element. At step S203 the data processing apparatus determines if the first graphical element has been resized beyond a first predetermined threshold size. If so at S204 a second graphical element is displayed to replace the first graphical element. If not, the data processing, apparatus determines if the first graphical element has been resized so as to be smaller than a second predetermined threshold size. If so, the data processing apparatus displays a third graphical element at step S206. If not, the data processing apparatus continues to display the first graphical element.

Insofar as the embodiments of the invention described above are implemented, at least in part, using software controlled data processing apparatus, it will be appreciated that a computer program providing such software control and a transmission, storage or other medium by which such a computer program is provided are envisaged as aspects of the present invention.

Various modifications can be made to the above described embodiments without departing from the scope of the invention. For example, it will be appreciated that suitable data processing apparatuses for implementing examples of the present invention typically include all suitable data processing apparatuses that include a display means such as a screen. This includes for example mobile telephones, games consoles such as the Sony PS3™, portable game devices such as the Sony PSP™, set top boxes, televisions, personal media players, tablet computing devices and so on.

Further more, although examples of the present invention have been described mainly with reference to graphical elements provided by an application (or applications) being executed in conjunction with an operating system running on the data processing apparatus itself, in some examples the graphical elements can be provided via a web application presented in a web browser such as Internet Explorer™, Firefox™ or Chrome™. In such examples the application or applications could be Flash™ or Silverlight™ applications embedded in the browser.

The invention claimed is:

1. A data processing apparatus for running one or more computer program applications, the data programming apparatus being operable to display at least one resizable graphical element from a plurality of resizable graphical elements on a display and to resize the at least one displayed graphical element in response to a resize control input from a user control, wherein the data processing apparatus is operable to switch between which of the plurality of graphical elements is displayed when the displayed graphical element is resized to be greater in size or to be less in size than one of a plurality of predetermined threshold sizes, and each of the plurality of graphical elements includes at least one graphical object or interface control different from the other graphical elements of the plurality of graphical elements, at least one of a greater size of one of the plurality of predetermined threshold sizes, a greater a number of controls, and graphical objects included in the graphical element that is displayed is modified when the displayed graphical element is resized to exceed said one of the plurality of predetermined threshold sizes, the plurality of graphical elements are displayable by respective computer program applications, the respective computer program applications for the plurality of graphical elements being different from one another, and said switch between which of the plurality of graphical elements is displayed is from display of a first one of the graphical elements associated with a first computer program application to display of a second one of the graphical elements associated with a second computer program application, the first computer program application being different from the second computer program application.

2. A data processing apparatus according to claim 1, wherein the data processing apparatus is configured to render each of the plurality of graphical elements on the display at substantially a same time and to switch between displaying the graphical elements by displaying only graphical elements to be displayed as non-transparent.

3. A data processing apparatus according to claim 1, wherein, when the data processing apparatus switches between displaying the graphical elements, the data processing apparatus retrieves data from a server to display in conjunction with at least one of the plurality of graphical elements.

4. A data processing apparatus according to claim 3, wherein the data is user data indicating previous activity of a user using the data processing device.

5. A data processing apparatus according to claim 1, wherein the data processing apparatus is operable to substantially simultaneously display at least two of the graphical elements, and the data processing apparatus is configured to stop displaying one of the at least two graphical elements when the other one of the graphical elements is resized.

6. A data processing apparatus according to claim 1, wherein the different computer program applications are for a same type of user interface, the same type of user interface being a music playback interface.

7. A data processing apparatus for running one or more computer program applications, the data programming apparatus being operable to display at least one resizable graphical element from a plurality of resizable graphical elements on a display and to resize the at least one displayed graphical element in response to a resize control input from a user control, each graphical element including at least one of a plurality of graphical objects and interface controls, wherein the data processing apparatus is operable to switch between which of the plurality of graphical elements is displayed when the displayed graphical element is resized to be greater in size or to be less in size than one of a plurality of predetermined threshold sizes, each of the plurality of graphical elements includes at least one graphical object or interface control different from the other graphical elements of the plurality of graphical elements, one or more of at least two of the graphical objects and interface controls being associated with functions provided by at least two different computer program applications, and said switch between which of the plurality of graphical elements is displayed is from display of a first one of the graphical elements associated with a first computer program application to display of a second one of the graphical elements associated with a second computer program application, the first computer program application being different from the second computer program application.

8. A data processing apparatus according to claim 7, wherein the different computer program applications are for a same type of user interface, the same type of user interface being a music playback interface.

9. A method of displaying resizable graphical elements on a display, the method comprising:
resizing a graphical element displayed on the display in response to a resize control input from a user control, and
switching from displaying the graphical element to displaying another graphical element from a plurality of graphical elements when the resize control input is such that the graphical element is resized to be greater in size or to be less in size than one of a plurality of predetermined threshold sizes, each of the plurality of graphical elements including at least one graphical object or interface control different from the other graphical elements of the plurality of graphical elements, wherein
at least one of a greater size of one of the plurality of predetermined threshold sizes, a greater a number of controls, and graphical objects included in the graphical element that is displayed is modified when the displayed graphical element is resized to exceed said one of the plurality of predetermined threshold sizes,
the plurality of graphical elements are displayable by respective application programs, the respective application programs for the plurality of graphical elements being different from one another, and
the switching between which of the plurality of graphical elements is displayed is from display of a first one of the graphical elements associated with a first application program to display of a second one of the graphical elements associated with a second application program, the first application program being different from the second application program.

10. A method according to claim 9, comprising:
rendering all of the plurality of graphical elements on the display at substantially a same time, and
switching between displaying the graphical elements by displaying only one graphical user element at a time as non-transparent.

11. A method according to claim 9, comprising:
running on the data processor the respective application programs, and
displaying each graphical element on the display in response to one of the plurality of application programs, wherein the switching includes
switching, in response to the resize control input, from running the first application program of the plurality that is generating the currently displayed graphical element to running the second application program of the plurality that generates a corresponding second graphical element different from the currently displayed graphical element.

12. A method according to claim 9, wherein the switching includes
retrieving data from a server to display in conjunction with at least one of the plurality of graphical elements.

13. A method according to claim 9, comprising:
substantially simultaneously displaying at least two of the graphical elements, wherein the switching includes
stopping display of one of the at least two graphical elements when the other one of the graphical elements is resized.

14. A non-transitory computer-readable storage medium storing computer-readable instructions that, when executed by a computer, cause the computer to perform the method according to claim 9.

15. A method according to claim 9, wherein the different application programs are for a same type of user interface, the same type of user interface being a music playback interface.

16. A method of executing one or more computer program applications on a data processing apparatus, the method comprising:
displaying at least one resizable graphical element from a plurality of resizable graphical elements on a display,
resizing the at least one displayed graphical element in response to a resize control input from a user control, each graphical element including at least one of a plurality of graphical objects and interface controls, and
switching between which of the plurality of graphical elements is displayed when the displayed graphical element is resized to be greater in size or to be less in size than one of a plurality of predetermined threshold sizes,
each of the plurality of graphical elements including at least one graphical object or interface control different from the other graphical elements of the plurality of graphical elements, where one or more of at least two of the graphical objects and interface controls being associated with functions provided by at least two different computer program applications, and
the switching between which of the plurality of graphical elements is displayed is from display of a first one of the graphical elements associated with a first computer program application to display of a second one of the graphical elements associated with a second computer program application, the first computer program application being different from the second computer program application.

17. A non-transitory computer-readable storage medium storing computer-readable instructions that, when executed by a computer, cause the computer to perform the method according to claim 16.

18. A method according to claim 16, wherein the different computer program applications are for a same type of user interface, the same type of user interface being a music playback interface.

* * * * *